United States Patent [19]

Toji

[11] Patent Number: 5,325,146
[45] Date of Patent: Jun. 28, 1994

[54] AUTO FOCUS CONTROL SYSTEM FOR A REAR-FOCUS LENS APPARATUS

[75] Inventor: Shigeo Toji, Tokyo, Japan

[73] Assignee: Fuji Photo Film Co., Ltd., Kanagawa, Japan

[21] Appl. No.: 941,378

[22] Filed: Sep. 4, 1992

[30] Foreign Application Priority Data

Sep. 4, 1991 [JP] Japan .................... 3-224445

[51] Int. Cl.[5] ............................. G03B 13/36
[52] U.S. Cl. ................... 354/402; 348/353; 348/356
[58] Field of Search .......... 354/400, 402, 195.1, 354/195.12; 358/227

[56] References Cited

U.S. PATENT DOCUMENTS

| | | | |
|---|---|---|---|
| 4,735,494 | 4/1988 | Makino et al. | 358/227 X |
| 4,920,369 | 4/1990 | Kaneda et al. | 354/400 |
| 5,055,932 | 8/1991 | Hijikata | 358/227 |
| 5,140,357 | 8/1992 | Suda et al. | 358/227 X |
| 5,157,432 | 10/1992 | Fukuoka et al. | 354/400 |

*Primary Examiner*—William B. Perkey

[57] ABSTRACT

A differential value of a characteristic curve of a focus distance of a zooming lens versus a position of a focus lens is calculated or found from a table in a contrast or phase difference type auto focus mechanism by detecting a high frequency part of an image signal. A follow-up speed of a focus lens is stepped or continuously changed based on the differential value. A focus position of a focus lens can therefore be changed smoothly corresponding to displacement of a focus distance of a zooming lens. A current brightness and a brightness when the evaluative value is peak is compared. If a brightness difference is large, a peak is not recognized and processing is repeated. Also, a gain of an amplifier is reduced corresponding to a linear-, step- or curve characteristic of a focus position of the focus lens versus a focus distance of the zooming lens when a gain of an AGC circuit is relatively high, so that noise is a high frequency part is reduced. If an iris of the apparatus is relatively closed a gain of the AGC or an amplifier is relatively high, noise increases and the reference value therefore increases to judge a peak of an evaluative value certainly. If the iris is relatively opened, a gain of the AGC and the amplifier is relatively low and noise decreases wherein a peak is rapidly detected without the focus lens passing a focus point.

12 Claims, 12 Drawing Sheets

FIG. 1

FIG. 2 MAIN ROUTINE

FIG. 5 SER 1 ROUTINE

FIG. 3  FOCUS PROCESS ROUTINE

FS: FOCUS STATUS

INPUT DATA JUDGING PROCESS

FIG. 7  PEKRCG ROUTINE

FIG. 10A ORDINARY ZONE $\left(\dfrac{1}{3} \times \dfrac{1}{3}\right)$

FIG. 10B ENLARGED ZONE $\left(\dfrac{1}{2} \times \dfrac{1}{2}\right)$

FIG. 11  AF: ZOOM PROCESS

AUTO FOCUS CONTROL SYSTEM FOR A REAR-FOCUS LENS APPARATUS

BACKGROUND OF THE INVENTION

1. Field of the Invention

The present invention relates to a control device of an auto-focus mechanism equipped in a camera and an improvement for ensuring rapid and certain focusing.

2. Description of the Background Art

In the case that a zone for measuring a distance between an object and a camera is provided at a picture plane of the camera in an auto-focus mechanism of a contrast method type, a fixed and small zone is conventionally provided at a center portion of the picture plane. Usually, there is photographed a main object positioned at a center portion of the picture plane, so that a lens member is actuated in order to optimize a contrast ratio of a picture at the center portion of the picture plane.

However, when a picture is taken in light, generally a contrast ratio is remarkably reduced at a center portion of the picture. It becomes difficult to find, an optimum contrast in the case of a conventional zone for measuring a distance and therefore its focusing becomes wrong.

In the case of an auto-focus mechanisms in a type of a high frequency detecting method type is one of the contrast methods, an output of a picture image passes through an automatic gain control (AGC) circuit, a high frequency part of a signal of a picture image obtained from the automatic gain control circuit (hereinafter, it is referred as "a high frequency part") is picked up by passing a band pass filter, a picked-up high frequency part is detected in order to detect an evaluative value for focusing (hereinafter, it is referred as "an evaluative value"), and a proper focus position of a lens member where the evaluative value becomes peak is determined. That is, when focusing is proper, a contrast ratio becomes maximum and a high frequency part also becomes maximum. In such cases, one kind of a band pass filer is utilized. Usually, a circuit for amplifying by a fixed gain value is provided at a wave detected circuit in order to increase a sensitivity for picking up the high frequency part. In addition, it is judged whether a peak is over when the evaluative value is going down after the evaluative value is going up. However, a noise is usually included in the evaluative value. Unless the evaluative value changed more than a noise level, it cannot be found that the evaluative value is actually increased or decreased. Therefore, in a conventional method, it is judged whether a displacement of an evaluative value is greater or less than a fixed reference value.

However, in a conventional auto-focus mechanism, there is only one band pass filter. In the case of a narrow band pass filter, if a focus lens is initially positioned far from a proper focus point, a filter output is little changed although the focus lens is moved frontwards or backwards. In this case, a high frequency part is shifted to a relatively low frequency part and an amplitude of the signal is still small. Accordingly, the evaluative value is little changed initially so that it is very difficult to detect whether a frontward direction or a backward direction is a proper direction toward a focus point. Much time is needed to detect a peak of the evaluative value certainly. In the case of a broad band pass filter, a displacement of the evaluative value is changed slightly near the peak, so that it is difficult to detect a real peak certainly.

The above described relation between focusing and an amount of a high frequency part comes into existence in the case that a brightness of an object is constant. If a brightness of an object is changed while a focus lens is moving for detecting a peak of an evaluative value, a wrong evaluative value is recognized as a peak. This occurs since a high frequency part is changed in accordance with a displacement of a brightness.

In the case that an object is dark, an iris is further opened and a gain value of an AGC circuit becomes high. The high gain value of AGC is added to a fixed gain value of an amplifier circuit. Then, a gain value in a whole system becomes very high and a noise component is also increased. If the noise component is large, it is difficult to detect a change of the evaluative value although the evaluative value is increased or decreased a little. A peak of an evaluative value is unclear so that it cannot detect a proper focus position certainly. Further, a noise level is changed in accordance with an opening degree of an iris, a gain value of an AGC circuit and a gain value of an amplifier in a wave detector. It is a problem described as follows, if a reference value for detecting a displacement of an evaluative value is fixed.

(1) In the case of a fixed reference value as a relatively low level, when an iris is relatively closed, a gain of AGC is relatively high or a fixed gain of an amplifier is relatively high, a noise is increased in the evaluative value. A judgement of a peak of the evaluative value becomes unclear due to the noise. As a result, the judgement is sometimes wrong.

(2) On the contrary, in the case of a fixed reference value as a relatively high level, when an iris is relatively opened, a gain value of AGC is relatively low or a fixed gain of an amplifier is relatively low, a peak of the evaluative value cannot be judged until the evaluative value is much decreased, although a noise is relatively less. That is, the peak cannot be detected until a focus lens runs over a proper focus position some distance. A detection of the peak is delayed.

On the other hand, recently, a video camera of a rear focus lens type has been developed, in which a focus lens is provided behind a zooming lens. In the rear focus lens type, a proper focus position of a focus lens is changed depending on a focusing distance of a zooming lens. The focus position is changed as a curved line.

Conventionally, it is difficult to successively change a position of a focus lens in accordance with a focus distance of a zooming lens.

SUMMARY OF THE INVENTION

A purpose of the present invention is to resolve the above described problems, particularly, the first purpose is to provide an auto focus control device in an auto focus mechanisms of a rear focus lens type by setting a focus position of a focus lens smoothly corresponding to a focus distance of a zooming lens.

The second purpose of the present invention is to provide an auto focus control device in an auto focus mechanism of a contact method type by detecting a high frequency part to prevent incorrect focusing by detecting an evaluative value at a correct focusing timing and positioning a focus lens at a point where the evaluative value becomes maximum.

The third purpose of the invention is to provide an auto focus control device in an auto focus mechanisms of a contrast method type by detecting a high frequency part to focus a dark object correctly in a case that an evaluative value is detected and a focus lens is positioned at a point where the evaluative value becomes maximum.

The fourth purpose of the present invention is to provide an auto focus control device in an auto focus mechanism of a contrast method type by detecting a high frequency part to judge a peak of an evaluative value correctly without mistake in the case that a focus lens is positioned at a point where the evaluative value becomes peak.

To accomplish the first purpose, the present invention is characterized in that an auto focus control device includes means for calculating a differential value of the curve line in a relation between a focus distance of a zooming lens and a focus position of a focus lens, and means for changing a follow-up speed of the focus lens with respect to a focus distance of the zooming lens in accordance with the differential value.

To accomplish the second purpose, the present invention is characterized in that an auto focus control device includes means for detecting a brightness of an object, means for comparing a brightness of an object when an evaluative value becomes peak and a brightness of the object at the other time, and means for judging a detected peak of an evaluative value as reliable when a difference of the compared values is within a reference level and the detected peak of the evaluative value as unreliable when the difference of the compared values is over the reference level.

To accomplish the third purpose, the present invention is characterized in that an auto focus control device includes detecting means for detecting a high frequency part of a signal passed through an automatic gain control circuit and means for reducing a gain value of the detecting means in accordance with a gain value of the automatic gain control circuit.

To accomplish the fourth purpose, the present invention is characterized in that an auto focus control device includes means for changing a reference value in order to judge whether a displacement of an evaluative value is valuable or invaluable in accordance with an opening degree of an iris, a gain value of an automatic gain control circuit or a gain value of an amplifier circuit.

With respect to the first purpose, a differential value of a curve characteristic line in a relation of a focus distance of a zooming lens and a position of a focus lens is calculated or found from a table for any case of an auto focus mechanism of contrast method type by detecting a high frequency part or a type of a phase difference method. Thus, a follow-up speed of a focus lens is stepped or continuously changed in accordance with the differential value. The follow-up speed also means to stop the focus lens. By changing the follow-up speed in accordance with a differential value, a focus position of a focus lens can be changed smoothly corresponding to a displacement of a focus distance of a zooming lens.

With respect to the second purpose, with a brightness when the evaluative value is peak and a brightness at a moment when the evaluative value is not peak, for example, when an evaluative value is minimum is made. If a difference of brightness becomes large, it is not recognized as a peak and a peak detection is repeated.

With respect to the third purpose, a gain value of the amplifier is reduced corresponding to a linear-, step- or curve characteristic line between a focus position of the focus lens and a focus distance of the zooming lens when a gain value of the automatic gain control (AGC) circuit is relatively high, so that a noise component in a high frequency part is reduced.

With respect to the fourth purpose, in the case that an iris is relatively closed, a gain of the AGC is relatively high or a gain of the amplifier circuit is relatively high, a noise component becomes large so that the reference value become high in order to judge a peak of an evaluative value certainly. On the other hand, in the case that the iris is relatively opened, a gain value of the automatic gain control circuit is relatively low or a gain value of the amplifier circuit is relatively low, a noise component becomes low in order to detect a peak rapidly without a focus lens running over a focus point.

Further scope of applicability of the present invention will become apparent form the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 1:
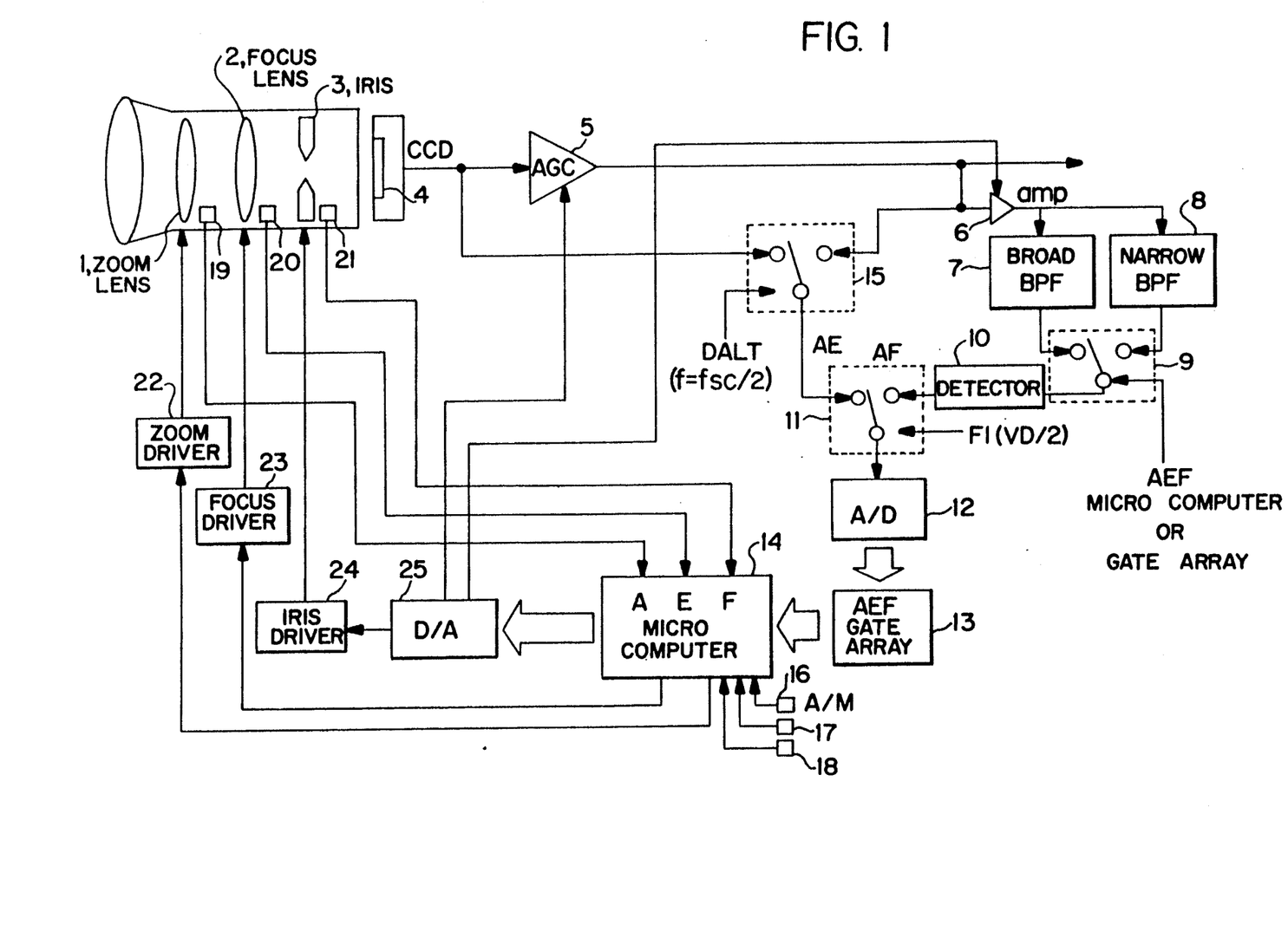
FIG. 1 shows a block diagram of a video camera with an auto focus control device according to the present invention.

One of the embodiments according to the present invention will be described with reference to FIG. 1 through FIG. 18. FIG. 1 shows a block diagram of a video camera according to the present invention. The video camera employs an auto focus mechanism of a contrast method type by detecting a high frequency part. Controls of auto focus and auto exposure are operated by a common micro computer. Further, the video camber employes a rear focus method in which a focus lens is positioned behind a zooming lens as an optical mechanism.

In FIG. 1, a picture image of an object formed by a zooming lens 1 and a focus lens 2 is input to a picture plane of a charge coupled device (CCD) 4 through an iris 3. A signal of a picture image is input from the CCD 4 to an amplifier circuit 6 through an automatic gain control circuit 5. An amplified output from the amplifier 6 is input to a broad band pass filter 7 and a narrow band pass filter 8. One of the signals from the bandpass filers 7 and 8 is selected by a switch 9 and input to a wave detector circuit 10. An output of the detector 10 is input to an analog/digital (A/D) converter 12 by a switch 11 when the FI signal is "0". A digital output signal of the A/D converter 12 is integrated for low frequency filtering by an integration gate array 13 and then an evaluative value showing a focus degree in an auto focus system is input form the integration gate array 13 of a microcomputer 14. The larger a high frequency part of the output signal of the CCD 4 becomes, the greater the evaluative value becomes. The output signal of the CCD 4 and the output signal of the AGC circuit 5 are alternatively selected by a switch 15 with $f_{sc}/2$. When the FI signal is "1", the output signal is input to the A/D converter 12 by the switch 11. The digital output signal of the A/D converter 12 is integrated by the gate array 13 and then its output signal is input to the micro computer 14 as an evaluative value regarding brightness in an auto focus system. The switch 9 is actuated in accordance with commands form the micro computer 14. The switch 11 is actuated in accordance with the FI signal which is alternatively changed "1" and "0" with VD/2. An A/M switch 16 for switching an auto focus position and a manual position, a zoom switch 17 for actuating an electric zoom member, a volume operating member 18 in a manual focusing period, an encoder 19 for detecting a position of the zooming lens 1, a sensor 20 for detecting a home position of the focus lens 2 and a hole element 21 for detecting an opening degree (iris value) of the iris 3 are connected to the computer 14 and the outputs are input to the computer 14 for auto focus and auto exposure. The computer 14 provides a control signal to a driving means 22 for driving the zooming lens 1 and a driving means 23 for driving the focus lens 2 and a driving means 24 for driving the iris 3, respectively, so that the position of the focus lens 2 and the iris 3 can be controlled. In addition, gain control signals are provided to the AGC circuit 5 and the amplifier 6 to control a gain value thereof. Numeral 25 denotes a digital/analog (D/A) converter.

An operation of the microcomputer 14 will be described in detail with reference to FIG. 2 through FIG. 18.

Figure 2:
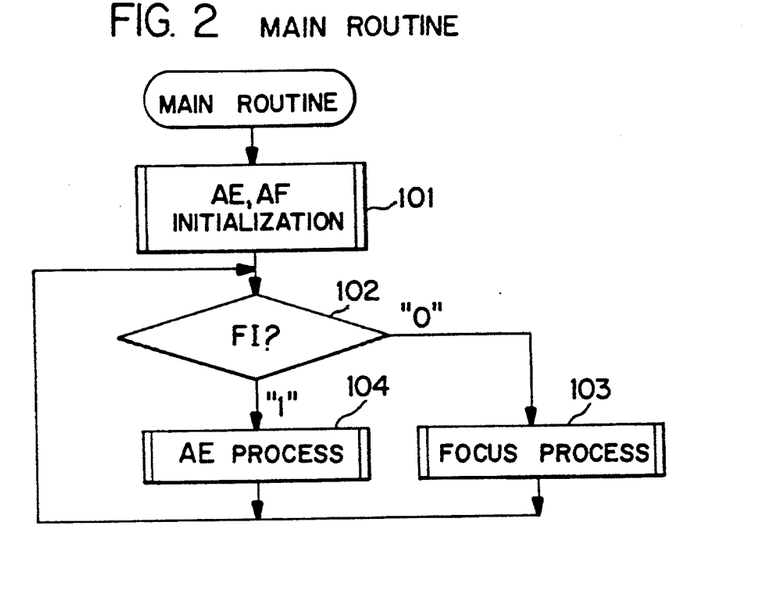
FIG. 2 shows a flow chart of a main routine.

FIG. 2 shows a main routine of the computer 14. After the computer 14 is switched on, an auto focus system and an auto exposure system are initialized in a step 101. An FI signal of the switch 11 is judged "1" or "0" in a step 102. If the FI signal is "0", an auto focus process, a manual focus process, and a zooming process of the both processes are operated in a step 103. If the FI signal is "1", a counter light judgement by a multi-divided light measurement, a spot light judgement are operated as an auto exposure process. The iris 3 and the AGC circuit 5 are together controlled in a step 104. These control values and input data can be always referred in a focus routine (see FIG. 3) in the same computer 14.

Figure 3:
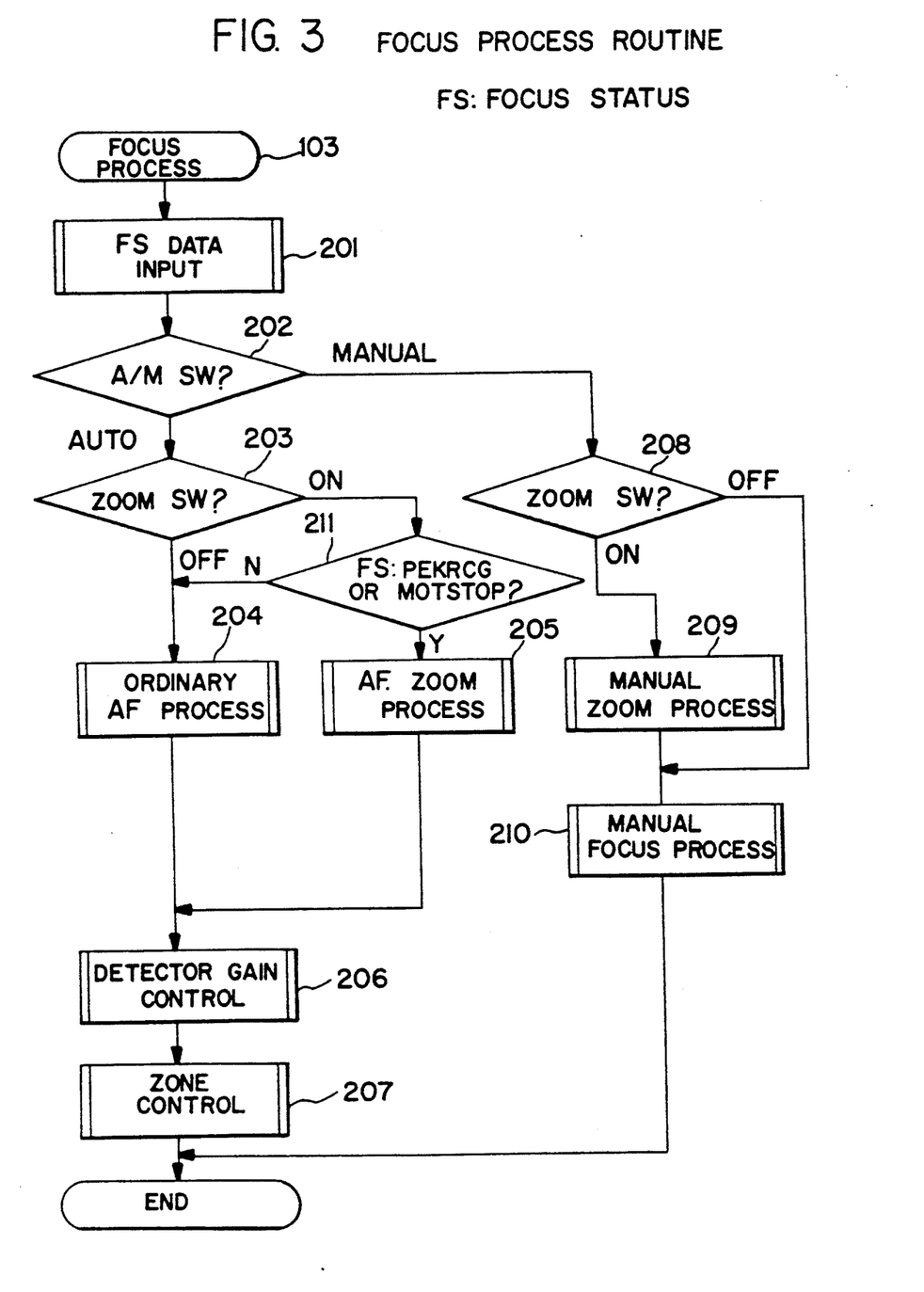
FIG. 3 shows a flow chart of a focus processing routine.

The focus process in the step 103 is operated along a routine as shown in FIG. 3. In step 201, the computer 14 receives an evaluative value of focus degree based on the output of the wave detector 10 as a focus data from the integral gate array 13. In the next step, A/M switch 16 judges whether a present mode is an automatic mode or a manual mode in a step 202. If the automatic mode is selected, it is judged whether a zoom switch 1 is OFF or ON in a step 203. If the zoom switch 17 is ON, it means that a status of the zoom switch 17 is ON in a telescope mode and a wide mode. If the zoom switch is OFF, an ordinary auto focus process (see FIG. 4) is operated in a step 204. Further, if the zoom switch is ON, it is necessary to operate a zoom process. In the case that a focus status data FS is recognized as REKRCG or MOTSTOP at a step 211, an auto focus zoom process is operated in a step 205 (see FIG. 11). After finishing an ordinary auto focus process or an auto focus zoom process, a wave detector gain control process (see FIG. 8) and a process for controlling a zone for measuring a distance are operated in order in steps 206 and 207. If an A/M switch 16 is shifted to the manual mode in the previous step 202, it is judged whether the zoom switch 17 is ON or OFF in a step 208. If the switch 17 is recognized ON, a manual zoom process (see FIG. 14) is operated in a step 209 and then a manual focus process (see FIG. 15) is operated in a step 210. If the zoom switch 17 is recognized OFF, the manual focus process is immediately operated at step 210.

Figure 4:
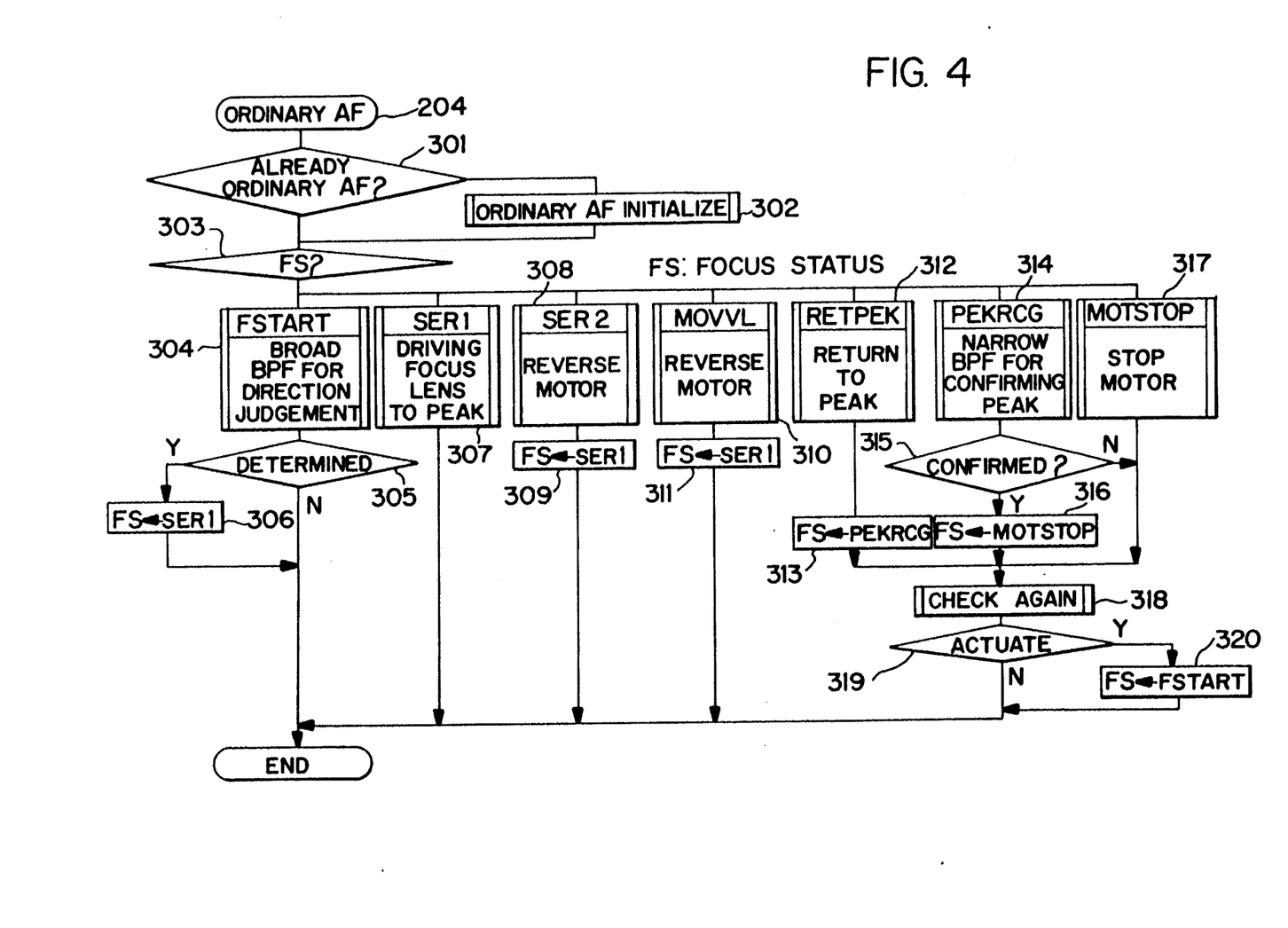
FIG. 4 shows a flow chart of an ordinary auto focus processing routine.

The ordinary auto focus process routine will be described with reference to FIG. 4 through FIG. 7. As shown in FIG. 4, it is judged whether the last process is an ordinary auto focus process or not at the first step 301. If it is judged NO, the ordinary auto focus process is initialized in a step 302. After a focus status FS information is set FSTART, the focus status information is judged in a step 303. There are six other kinds of the focus status, that is, SER1, SER2, MOVVL, RETPEK, PEKRCG, and MOTSTOP. The auto focus process is operated depending no the focus status information.

In the case of FSTART, the micro computer 14 controls the switch 9, selects an output of the broad band pass filter 7, actuates the focus lens 2 by the driver means 23 and judges a moving direction of the focus lens 2 for focusing. If the evaluative value is increased in accordance with a movement of the focus lens 2, the moving direction is a proper direction for focusing. On the contrary, if the evaluative value is decreased an opposite direction is a proper direction for focusing. If the evaluative value doe snot change, a proper direction for focusing is unclear. If a moving direction of the focus lens 2 is determined in a step 305, a focus status information is rewritten to SER1 in a step 306 and an operation returns to the step 303.

Figure 5:
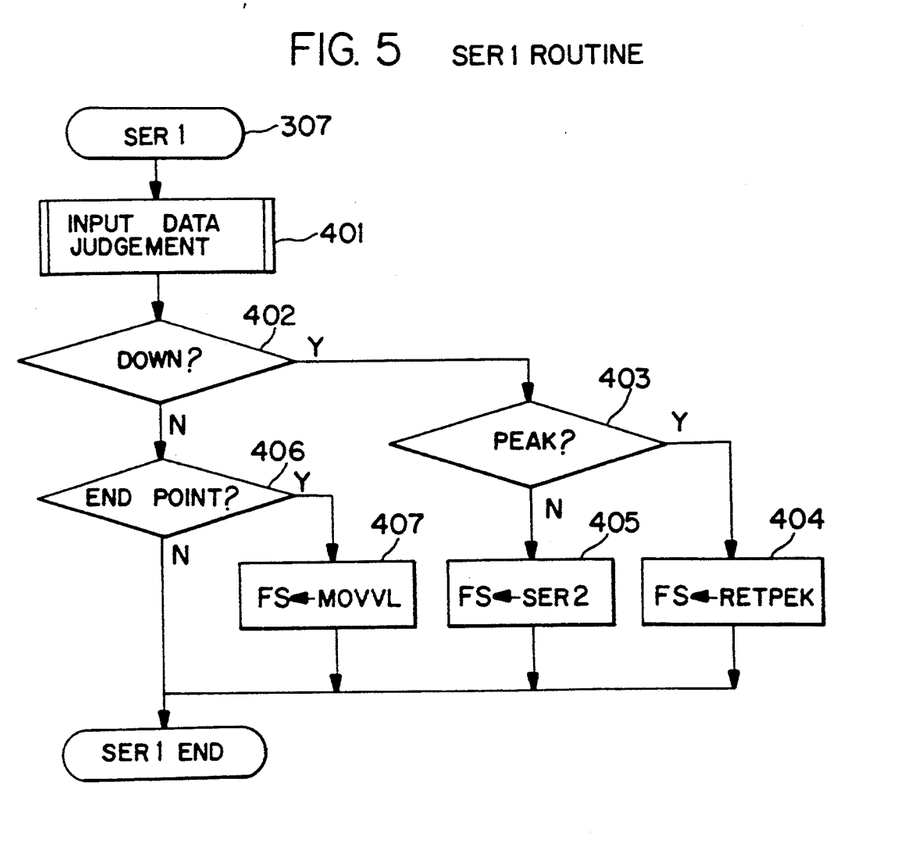
FIG. 5 shows a flow chart of SER1 routine for detecting a peak of an evaluative value.
Figure 6:
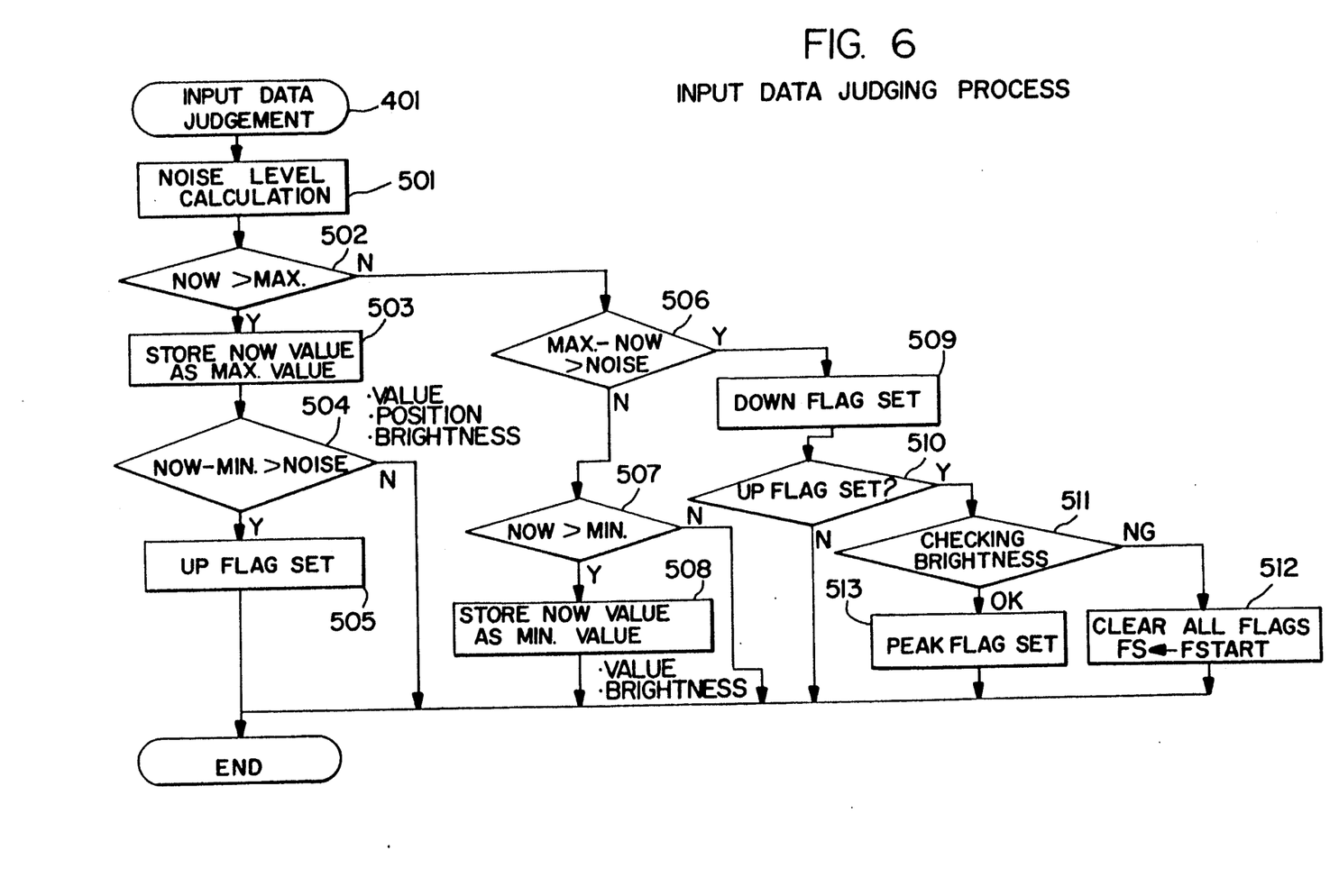
FIG. 6 shows a flow chart of a routine for judging an input data.

In this case, the focus status information is SER1, operation goes to a step 307, in which the focus lens 2 is driven until a peak of the evaluative value is found. A process routine of the SER1 is described in detail in FIG. 5. In FIG. 5, a process of judging an input data is operated in a routine as shown in FIG. 6 in a step 401 in which it is judged whether the evaluative value is going up or down or coming peak. In the next step 402, it is judged whether the evaluative value is going down or not. If it is judged the evaluative value is going down, it is judged whether a peak was coming over or not before the evaluative value going down. If a peak is running over, a focus status data is rewritten to RETPEK in a step 404. Unless a peak is running over, it is judged that an operation was wrong and the focus status is rewritten to SER2. In the case that the evaluative value is not going down in the previous step 402, it is judged whether the focus lens 2 has approached an end point or not in a step 406. If it is judged that the focus lens 2 has approached the end point, it is recognized that the operation is wrong and the focus status is rewritten to MOVVL in a step 407.

Next, a process routine for judging input data (step 401) will be described with reference to FIG. 6 A noise level is calculated in a step 501. A noise component is included in an evaluative value. Unless a displacement of the evaluative value is greater than the noise level, it cannot judge whether the evaluative value is going down or up. Therefore, it is necessary to know the noise level. Further, the noise level is influenced by an iris value, a gain value of the AGC circuit 5 or a gain value of the amplifier 6. The noise level is calculated based on the above factors. If a noise level is adjusted in the case that an UP flag exists or not, it is preferably to judge input data. Therefore, the noise level is calculated depending on an existence of the UP flag. FIGS. 16A through 16D show some examples of functional relation for calculating the noise level.

After calculating the noise level, it is judged whether a present evaluative value is greater than the last highest value in the next step 502. If the present evaluative value is greater than the last highest value, the present evaluative value is renewed as the new highest value and stored in a register in a step 503. At that time, the position of the focus lens 2 and a brightness of an auto exposure system are simultaneously memorized. In the next step 504, it is judged whether a deference between the present evaluative value and the last lowest value is greater than a noise level N1. If the difference is greater than the noise level N1, it means that the evaluative value is increasing and then the UP flag is set in a step 505.

In the case that the present evaluative value is less than the last highest value in the step 502, it is judged whether a difference between the last highest value and the present evaluative value is greater than the noise level N1 in a step 506. If the difference is less than the noise level N1, it is judged whether the present evaluative value is less than the last lowest value in the next step 507 and ten the present evaluation value is renewed as the new lowest value and stored in a register in the next step 508. A brightness of the auto exposure system at the time is also memorized.

In the case that the difference between the highest value and the present evaluative value is greater than N1, it means that the evaluative value is going down. In a step 509, a DOWN flag is set. In the next step 510, it is judged whether the UP flag is already set or not. If the UP flag is already set, it is recognized that a peak of the evaluative value has existed. However, the peak of the evaluative value is also occurs if a brightness of an object is changed during an operation. To avoid such wrong judgment, a brightness of the object at a peak time is detected at a step 511. A brightness of the auto focus exposure system at a moment when an evaluative value becomes the maximum value is much greater than a value at a moment when the evaluative value becomes the minimum value, for example, a ratio thereof is equal or more than 120%, the UP flag and the DOWN flag are cleared and the focus status data is rewritten to FSTART. If the ratio is no so high, it is recognized that the peak of the evaluative value has existed and a peak flag is set in a step 513.

A control of the auto exposure system will next be explained. The microcomputer 14 calculates a brightness of an object based on an opening degree of the iris 3 and a gain value of the AGC circuit 5. That is, the higher the brightness of an object becomes, the more the iris 3 is closed. The lower the brightness of an object becomes, the more the iris 3 is opened. If the iris 3 is released and then the brightness of an object becomes dark, the gain of the AGC circuit 5 becomes higher. When an electric shutter is actuated, an opening degree of the iris 3 is more increased and a gain of the AGC circuit 5 becomes higher, while a shutter speed becomes more faster. A brightness of an object can be calculated by considering this information by the computer 14.

In the case that the focus status information is SER2, a motor for driving the focus lens 2 is reversely driven in the step 308 as shown in FIG. 4. The focus status data is rewritten in the next step 309. As shown in FIG. 5, the steps 401, 402, 403 and 405 are operated in order along a flow chart of a SER1 process routine. If a peak of the evaluative value cannot be found, it is necessary to reversely drive the focus lens 2 in order to find the peak of the evaluative value in the SER1 process routine.

In the case that the focus status data is MOVVL, the situation is similar to SER2. That is, the motor for driving the focus lens 2 is reversely driven in the step 310 as shown in FIG. 4. The focus status is rewritten to SER1 in the next step 311. As shown in FIG. 5, the steps 401, 402, 406 and 407 are operated in order along the flow chart. The focus lens 2 is approached at the end point while the evaluative value is not going down so that it is necessary o reversely drive the focus lens 2 in order to find a peak of the evaluative value in the SER1 routine.

In the case that the focus status becomes RETPEK by finding the peak a the step 403 in FIG. 5, the focus lens 2 is returned to a position where the evaluative value becomes maximum in the step 312 in FIG. 4, the focus status FS is rewritten to DEKRCG in the next step 313 an it is checked to actuate the motor for driving the focus lens 2 again at the step 318. If the step 319 judges that it is necessary to actuate the motor again (it will be described later), the focus status data is rewritten to FSTART at a step 320.

Figure 7:
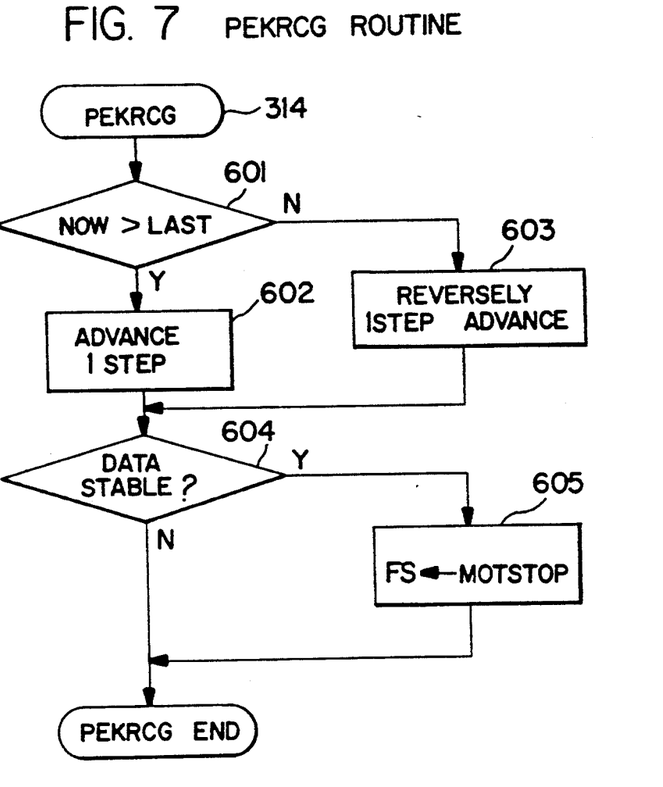
FIG. 7 is a flow chart of PEKRCG routine for confirming a peak of an evaluative value.

In the case that a focus status data is PEKRCG, an output of the narrow band pass filter 8 is selected by controlling the switch 9 in a step 314 in FIG. 4 in order to confirm the peak of the evaluative value. The PEKRCG routine is shown in FIG .7 in detail. Initially, the present evaluative value is compared with the previous value in a step 601. If the present value is greater than the previous value, a position of the focus lens 2 is advanced on step at a step 602. If the previous value is greater than the present value, the position of the focus lens 2 is oppositely advanced one step in a step 603. In a step 604, it is judged whether the data becomes stable or not by judging whether the evaluative value corresponding to position of the focus lens 2 advanced forwardly/backwardly some steps is within a specified noise level ($-N2/+N2$). If the data is stable in a predetermined period, it is recognized that the focus lens 2 is located at a point where the evaluative value becomes the peak and the focus status data FS is rewritten to MOTSTOP in a step 605.

After finishing the PEKRCG process, it is judged whether a confirmation of the peak of the evaluative value is finished or not at a step 315 in FIG. 4. If the confirmation is finished, the focus status FS is rewritten to MOTSTOP in a step 316 and then an operation goes to a step 318 for checking the actuation of the motor again in a step 318. Unless the confirmation is finished, the operation goes to a step directly for checking the actuation of the motor again.

In the case that the focus status is MOTSTOP, a motion of the focus lens 2 is stopped by stopping the motor and then the operation goes to the step 318.

Figure 17:
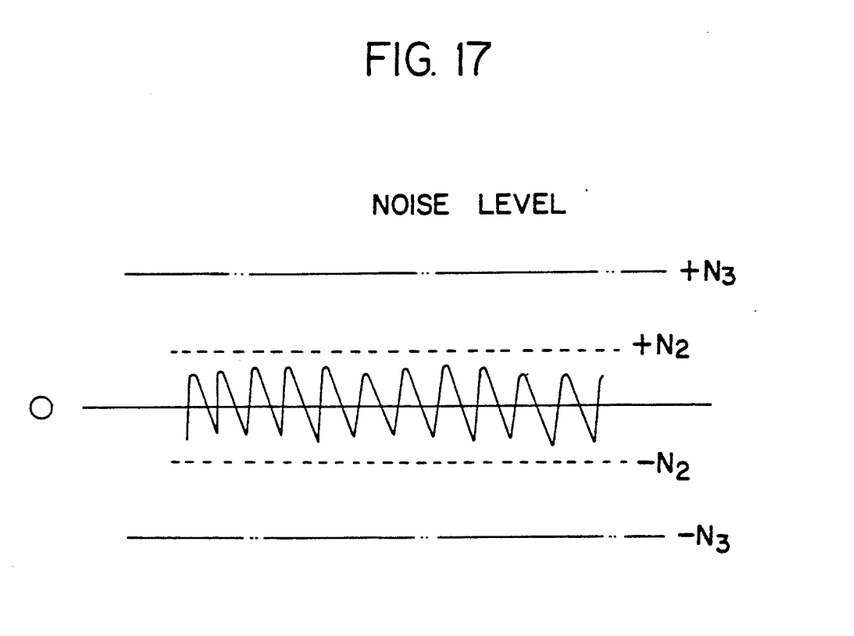
FIG. 17 shows some types of noise levels.

In the step 318 for checking an actuation of the motor again, the following process is operated. It is judged whether the evaluative value at a focus position is changed more than a predetermined level ($-N3/+N3$). If the displacement amount is more than the level $-N3/+N3$, it is judged that focusing is not proper and it is concluded to repeat an auto focus process from the first at a step 319 and the focus status FS is rewritten to FSTART. As shown in FIG. 17, it is set that N3 is greater than N2.

Figure 8:
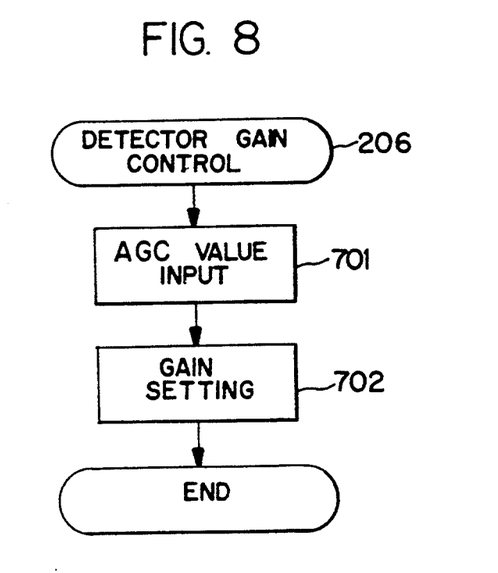
FIG. 8 is a flow chart of a processing routine for controlling a gain of an amplifier circuit.
Figure 18:
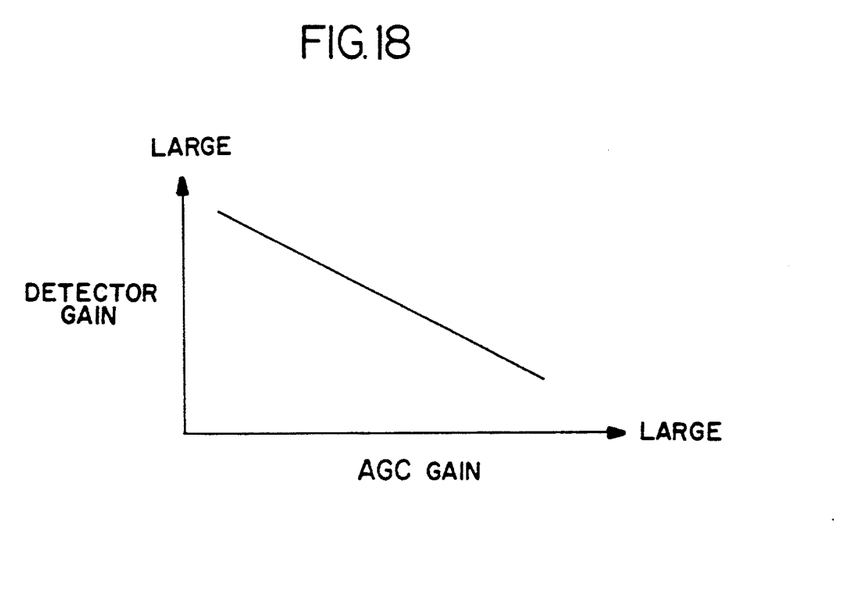
FIG. 18 shows a characteristic of a gain of an amplifier.

Next, a process routine for controlling a gain value of the wave detector 10 with reference to FIGS. 8 and will be described. A gain value of the AGC 5 is input at a step 701. Corresponding to the gain value, a gain value of the amplifier 6 is determined from a relation, for example, as shown in FIG. 18 for reducing a noise in a whole system when the gain value of the AGC 5 is relatively high in a step 702.

Figure 9:
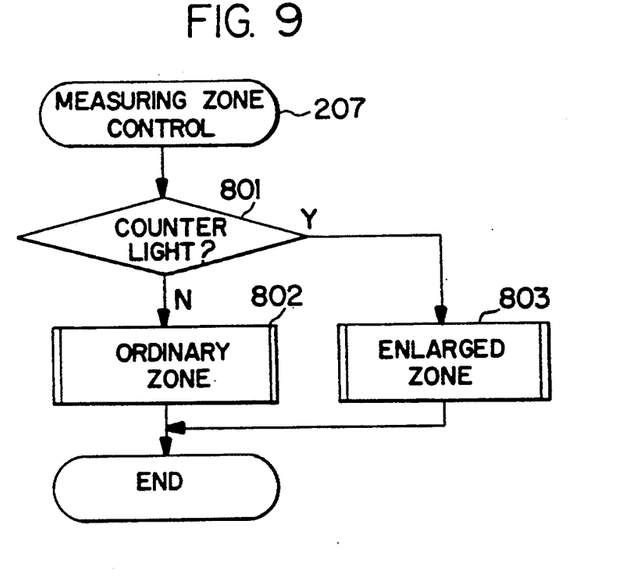
FIG. 9 is a flow chart of a processing routine for controlling a zone for measuring a distance.
Figure 10A:
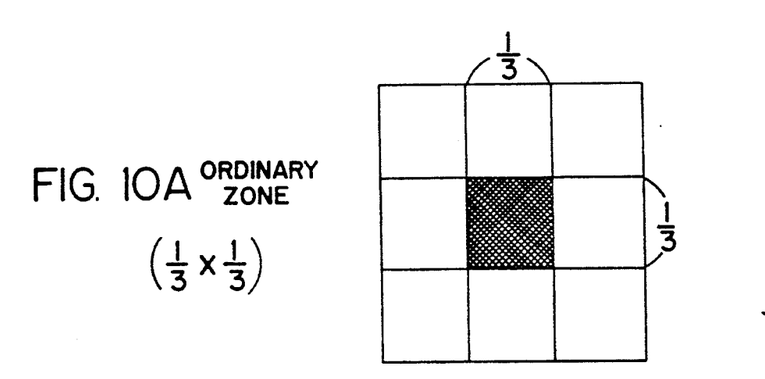
FIGS. 10A and 10B show an example of a zone for measuring distance.
Figure 10B:
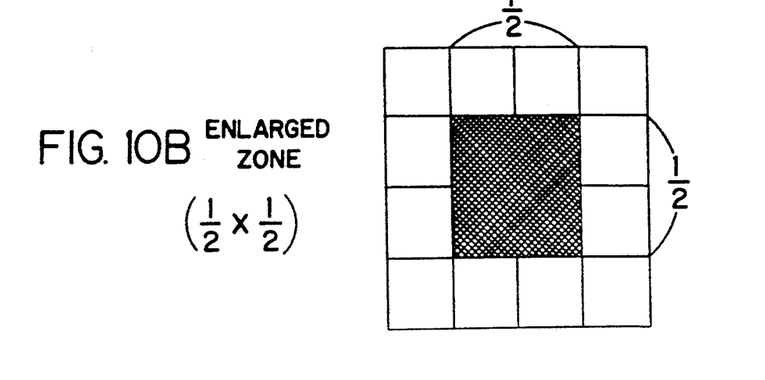

A process for controlling a zone for measuring a distance in a step 207 in FIG. 3 with reference to FIGS. 9 and will be described. A step 801 in FIG. 9 judges whether it is a counter light or not form an information of an auto exposure system. If it is not the counter light, an ordinary zone for measuring a distance having ⅓ length and ⅓ width of a picture plane is provided at a center portion as shown in FIG. 10A in a step 802 and a focus process is operated based on a signal form the zone. If it is a counter light, an enlarged zone for measuring a distance having ½ length and ½ width of a picture plane is provided at a center portion as shown in FIG. 10B.

Figure 12:
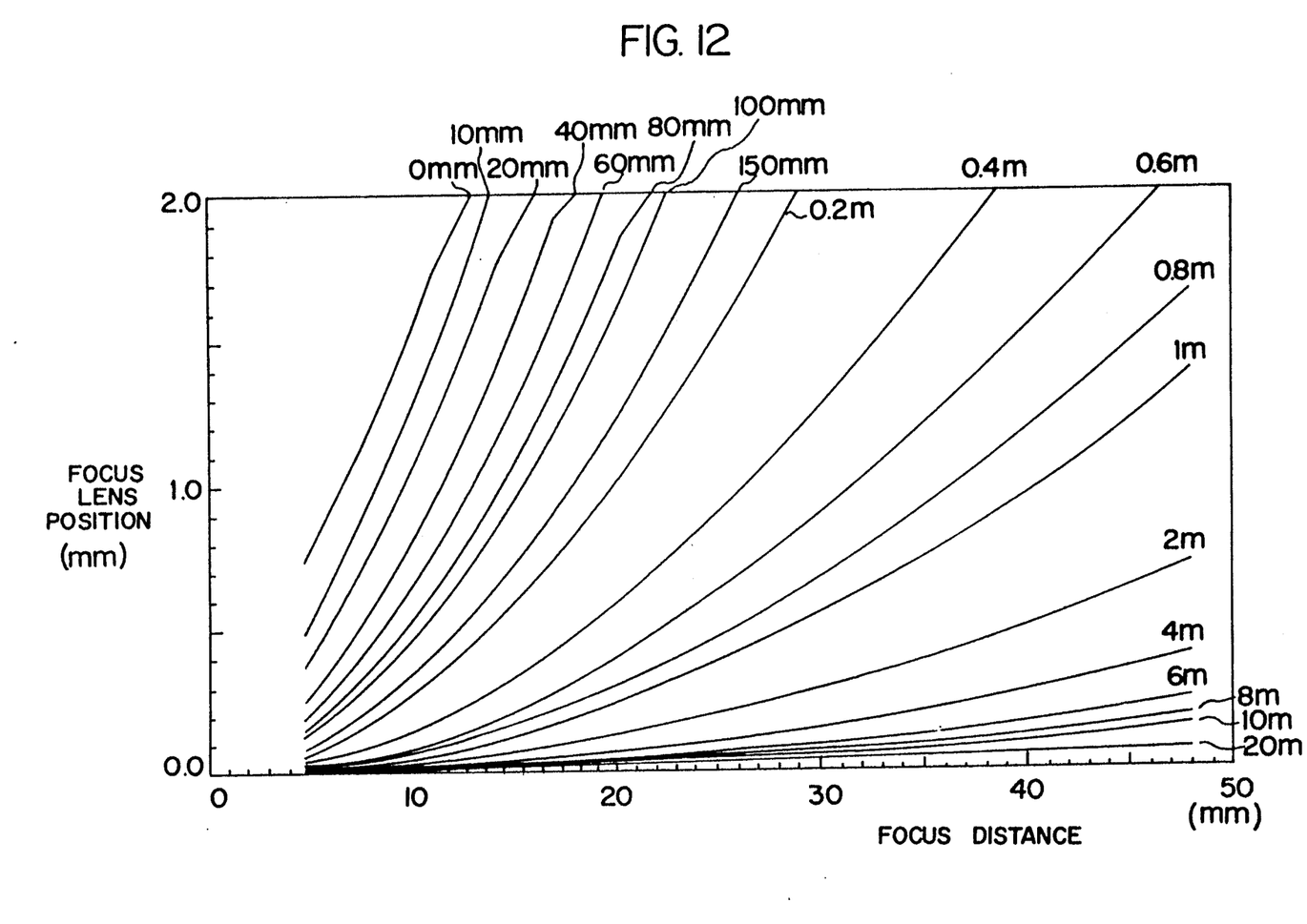
FIG. 12 shows a relation between a focus distance and a focus position of a focus lens.
Figure 13:
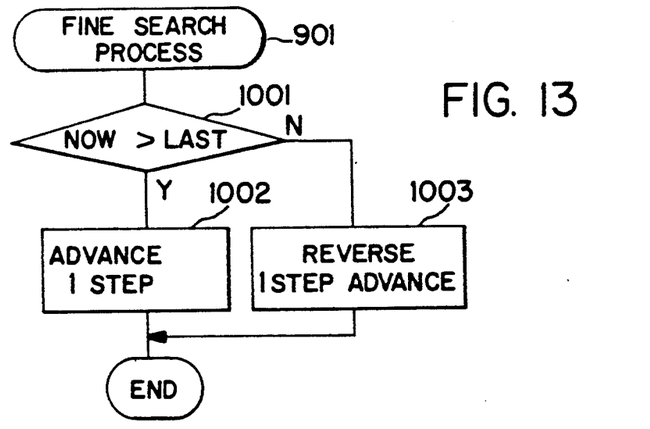
FIG. 13 shows a flow chart of a process routine for fine adjustment search.

An auto focus zoom process in a step 205 as shown in FIG. 3 with reference to FIGS. 11 through 13 will be described. The focus is matching at a step 211, a differential value of an auto focus zoom trucking is calculated at a step 901 in FIG. 11. In the auto focus zoom process, as shown in FIG. 12, a elation between the focus distance of the zooming lens 1 and a position of the focus lens 2 is previously known with a distance between a camera and an object as a parameter. It is necessary to displace a position of the focus lens 2 along a parameter characteristic curve corresponding to a movement of the zooming lens 1 by memorizing a function or a table of the relation. It is better to switch a control of a position of the focus lens in accordance with a displacement of a position of the focus lens with respect to a change of a focus distance, that is an amount of the differential value. A differential value from its characteristic line as shown in FIG. 12 may be detected every time. However a differential line most closely matches an original characteristic line in a rear focus optical system according to the present invention, that is, the original characteristic line is an exponential function so that a differential value is obtained by multiplying a value of a position of the focus lens by a coefficient corresponding to a parameter of a distance between an object and the camera.

In the next step 902, it is judged whether the differential value is greater than the predetermined value. If the differential value is less than the predetermined value, a process of a fine adjustment search is operated in the next step 903. In the process for a fine adjustment search, as shown in FIG. 13, a position of the focus lens is advanced one step. Initially, the evaluative value at present focusing time is compared with the previous evaluative value in step 1001. If the present evaluative value is greater than the previous value, the position of the focus lens is further advanced one step along the same direction in a step 1002. If the present value is less than the previous value, the position of the focus lens is advanced one step along the opposite direction in a step 1003.

Figure 11:
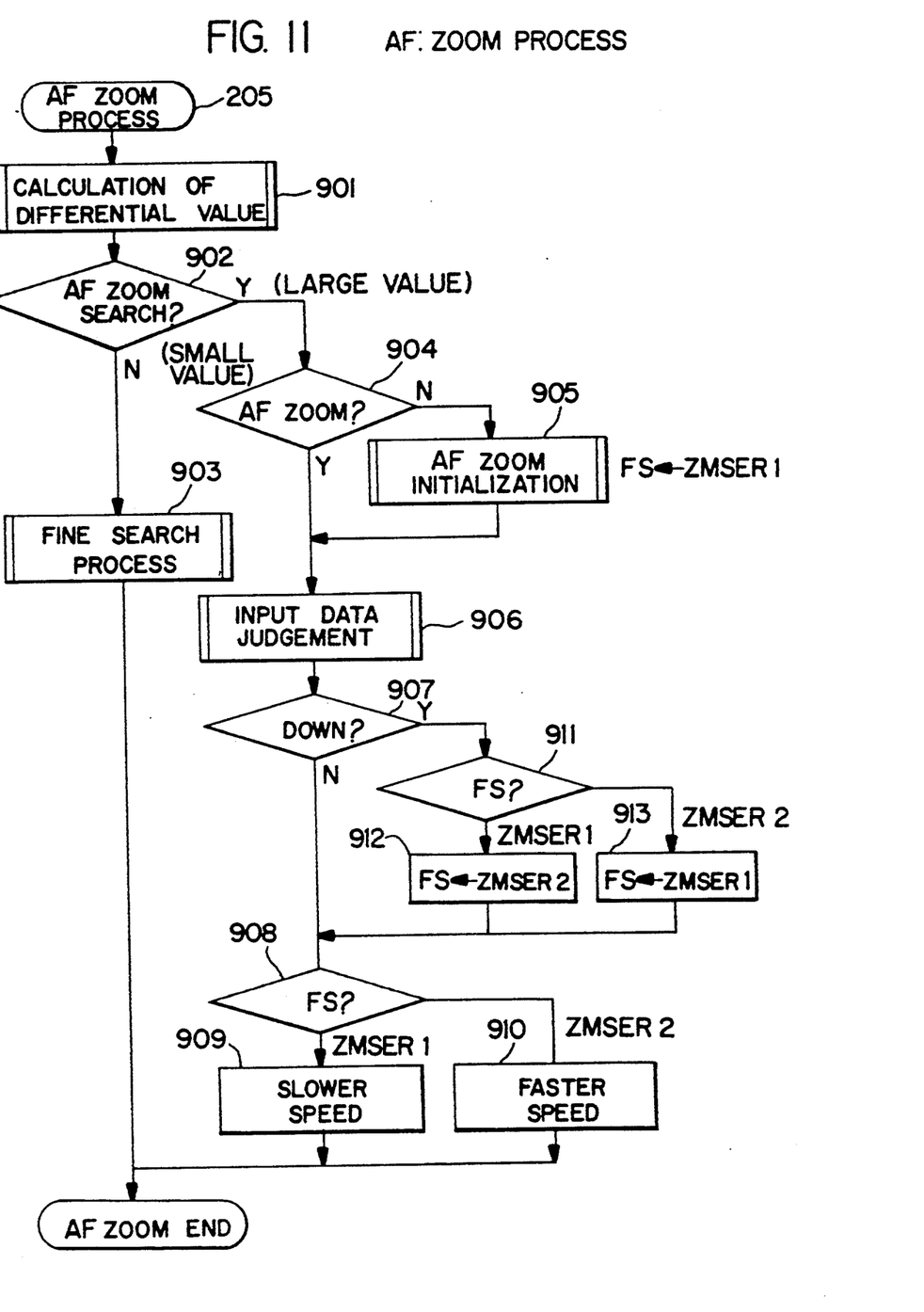
FIG. 11 shows a flow chart of an auto focus zoom processing routine.

On the other hand, in the case that the differential value is greater in the step 902 as shown in FIG. 11, it is judged whether it was an auto focus zooming process at the previous time in a step 904. If it was not the auto focus zooming process, the auto focus zooming process is initialized at a step 905. After the focus state FS is written as ZMSER1, the operation goes to a step 906.

The step 906 is a process judging input data. It is of a similar component of the step 401 in a process of SER1 in FIG. 5 so that it is operated the same process for judge input data described in FIG. 6. It is judged whether the evaluative value at a focusing position is going up or down from a result of the process for judging the input data in a step 907. Unless the evaluative value is going down, it is judged whether a focus status data is ZMSER1 or ZMSER2 is a step 908. If the focus status is ZMSER1 in the step 908, a position of the focus lens 2 is moved with a speed slower than the differential value at a step 909. If the focus status is ZMSER2, a position of the focus lens 2 is moved with a speed faster than the differential value at a step 910. However, in the case that the evaluative value is judged going down at the step 907, a focus status is judged at a step 911. If the focus status is ZMSER1, the focus status is rewritten to ZMSER 2. If the focus status is ZMSER2, the status is rewritten to ZMSER1 at a step 913. The operation goes to a step 908 and the position of the focus lens is moved in the step 909 or the step 910.

Figure 14:
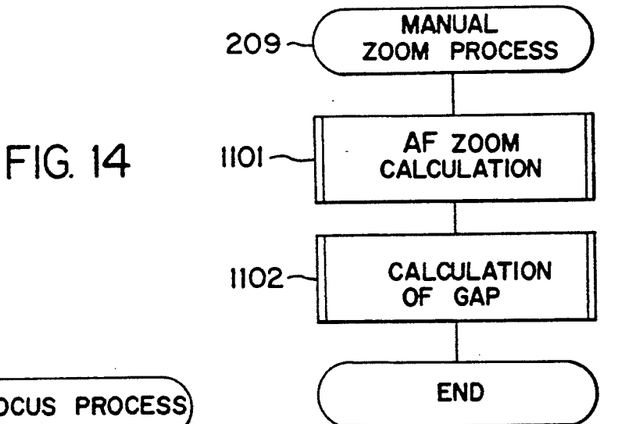
FIG. 14 shows a flow chart of a manual zoom process routine.
Figure 15:
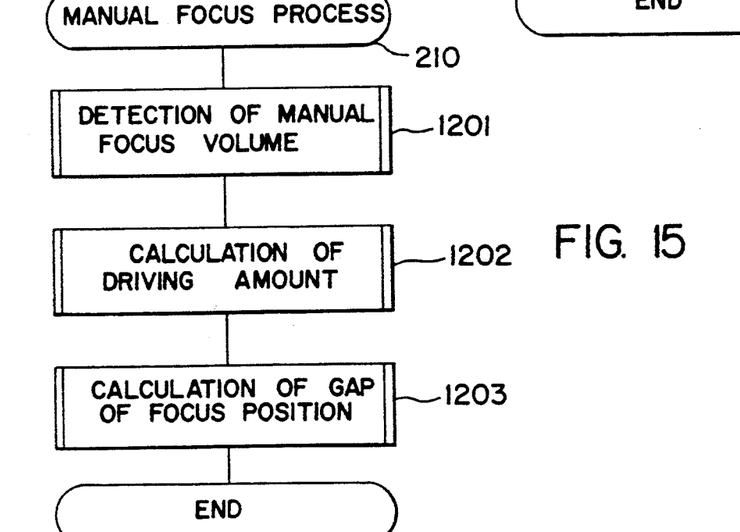
FIG. 15 shows a flow chart of a manual focus process routine.
Figure 16A:
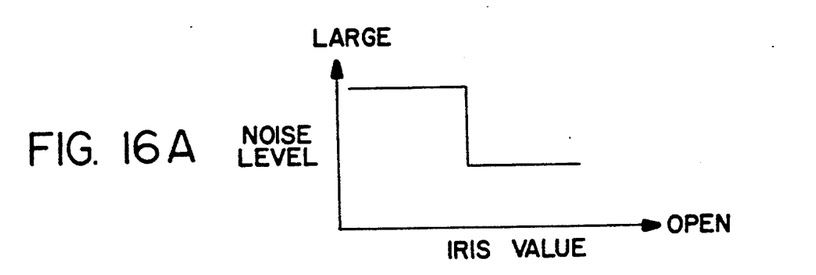
FIG. 16A through 16D show a functional relation between a noise level and the other parameters, respectively.
Figure 16B:
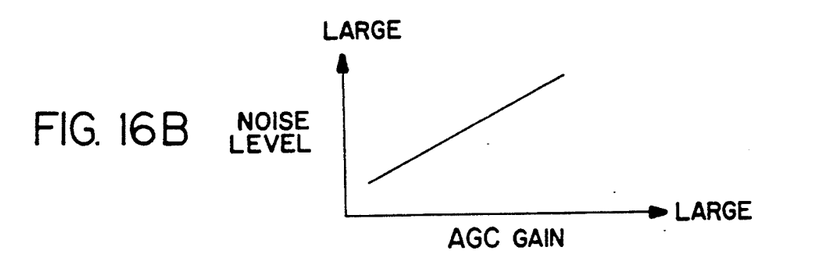
Figure 16C:
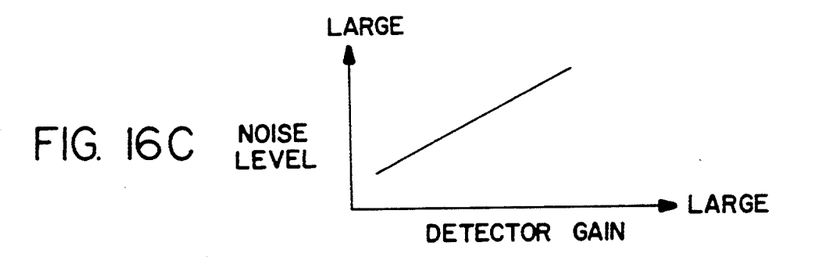
Figure 16D:
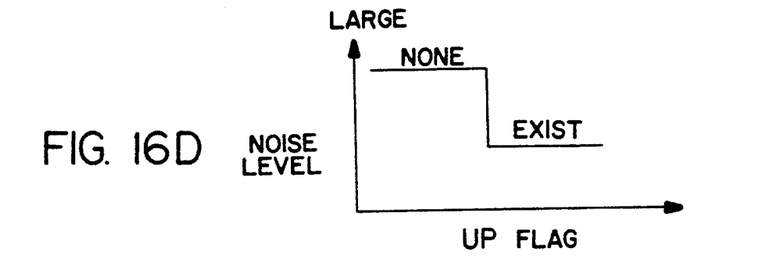

Next, a manual zoom process in a step 209 and a manual focus process in a step 210 in FIG. 3 will be described with respect to FIGS. 14 and 15. As shown in FIG. 14, an auto focus zoom trucking is calculated at a step 1101 initially in the manual zoom process. A portion of the focus lens corresponding to the zoom position is calculated in accordance with a relation between a focus distance and a position of the focus lens with a distance between an object an the camera as a parameter as shown in FIG. 12. A gap between an actual position of the focus lens and a calculated position of the focus lens is calculated. On the other hand, as shown in FIG. 15, in a manual focus process, an operation amount of a manual focus volume 18 is detected at a step 1201 initially. A driving amount of the focus lens corresponding to the operation amount is calculated at a step 1202. At the step 1203, a focus lens 2 is moved corresponding to the gap of the position of the focus lens calculated in the step 1102 for the manual zoom process and the driving amount of the position of the focus lens calculated in the step 1202 for a manual focus process.

As described above, in accordance with the present invention, differential values of a characteristic line in a relation between a focus distance of a zooming lens and a focus position of a focus lens is obtained by a calculation or a table. A follow-up speed of a focus lens is changed stepped or continuously corresponding to the difference value, so that a focus position of the focus lens can be smoothly changed in accordance with a displacement of a zoom distance of the zoom lens.

In accordance with the present invention, a brightness of an object at a moment when an evaluative value becomes peak and a brightness of an object that the other moment are compared. If the brightness of an object at a moment when an evaluative value becomes peak is changed very much, such a peak is not recognized as a real peak. Therefore, a judgement of a peak of a evaluative value is not influenced by a brightness of an object so that the judgement is operated correctly.

In accordance with the present invention, a reference value for judging a displacement of an evaluative value can be changed corresponding to a degree of an iris, a gain value of an AC circuit, or a gain value of a wave detector circuit, so that an over run of a focus lens can be reduced in a period for detecting a peak of an evaluative value and it is prevent form wrong judging a detected peak is prevented.

The invention being thus described, it will be obvious hat the same may be varied in many ways. Such variations are not to be regarded as a departure from the spirit and scope of the invention, and all such modifications as would be obvious to one skilled in the art ar intended to be included within the scope of the following claims.

I claim:

1. A contrast auto-focus control apparatus comprising:
   auto-focus means having a focus lens provided behind a zooming lens;
   detection means for detecting a differential value of a predetermined characteristic curve of a relationship between a focus distance of said zooming lens and a position of said focus lens; and
   control mean for varying follow-up speed of said focus lens to position said focus lens with respect to said focus distance based on said differential value.

2. The contrast auto-focus control apparatus of claim 1, further comprising:
   evaluation means for detecting an evaluative value for focusing by detecting a high frequency part of a signal of a picture image;
   positioning means for positioning the focus lens at a point where said evaluative value peaks;
   brightness means for detecting a brightness of an object of the picture image;
   comparison means for comparing the brightness of the object when said evaluative value peaks and a current brightness of the object to determined a displacement of brightness; and
   judgement means for judge a peak of said evaluative value as reliable when the displacement of brightness is within a predetermined level and as unreliable when the displacement of brightness is not within said predetermined level.

3. The contrast auto-focus control apparatus of claim 1, further comprising:
   automatic gain control means for controlling a gain of an image signal of a picture image of an object generated by photographing means;
   evaluation means for detecting an evaluative value for focusing by detecting a high frequency part of an output signal from said automatic gain control mean;
   positioning means for positioning the focus lens at a point where said evaluative value peaks;
   wave detecting means for detecting said high frequency part in accordance with a gain value of said automatic gain control means; and
   reduction means for reducing the gain value used by said wave detecting means.

4. The contrast auto-focus control apparatus of claim 1, further comprising:
   evaluation means for detecting an evaluative value for focusing by detecting a high frequency part of an image signal of a picture image;
   positioning means for positioning the focus lens at a point where said evaluative value peaks; and
   reference value varying means for varying a reference value depending on an opening degree of an iris, wherein a displacement of said evaluative value is judged as reliable or unreliable based on said reference value.

5. The contrast auto-focus control apparatus of claim 1, further comprising:
   automatic gain control means for controlling a gain of an image signal of a picture image of an object generated by photographing means;
   evaluation means for detecting an evaluative value for focusing by detecting a high frequency part of an output signal of said automatic gain control means;
   positioning means for positioning the focus lens at a point where said valuation value peaks; and
   reference value varying means for varying a reference value depending on a gain value of said automatic gain control means, wherein a displacement of said evaluative value is judged as reliable or unreliable based on said reference value.

6. The contrast auto-focus control apparatus of claim 1, further comprising:
   extraction means for picking up a high frequency part of an image signal of a picture image of an object generated by photographing means;
   wave detecting means for detecting said high frequency part;
   evaluation means for detecting an evaluative value for focusing based on an output of said wave detecting means;
   positioning means for positioning the focus lens at a point where said evaluative value peaks; and
   reference value varying means for varying a reference value depending on a gain value of said wave detecting means, wherein a displacement of said evaluative value is judged as reliable or unreliable based on said reference value.

7. A contrast auto-focus control method for an auto-focus apparatus having a focus lens provided behind a zooming lens comprising the steps of:
   detecting a differential value of a predetermined characteristic curve of a relationship between a focus distance of the zooming lens and a position of the focus lens; and varying follow-up speed of the focus lens to position the focus lens at the focus distance based on the detected differential value.

8. The contrast auto-focus control method of claim 7, comprising the further steps of:

determining an evaluative value for focusing by detecting a high frequency part of an image signal of a picture image;

positioning the focus lens at a point where the evaluative value peaks;

detecting a brightness of an object of the picture image;

comparing the brightness of the object when the evaluative value peaks and a current brightness of the object to determine a displacement of brightness; and judging a peak of the evaluative value as reliable when the displacement of brightness is within a predetermined level and as unreliable when the displacement of brightness is not within the predetermined level.

9. The contrast auto-focus control method of claim 7, comprising the further steps of:

automatically controlling a level of gain of an image signal of a picture image of an object generated during photography;

determining an evaluative value for focusing by detecting a high frequency part of the gain controlled image signal;

positioning the focus lens at a point where the evaluative value peaks;

wave detecting the high frequency par tin accordance with the gain level used during said step of automatically controlling; and reducing the gain level sued during said step of wave detecting.

10. The contrast auto-focus control method of claim 7, comprising the further steps of:

determining an evaluative value for focusing by detecting a high frequency part of an image signal of a picture image;

positioning the focus lens at a point where the evaluative value peaks; and varying a reference value depending on a degree of opening of an iris of the auto-focusing apparatus, wherein a displacement of the evaluative value is judged as reliable or unreliable based on the reference value.

11. The contrast auto-focus control method of claim 7, comprising the further steps of:

automatically controlling a level of gain of an image signal of a picture image of an object generated during photography;

determining an evaluative value for focusing by detecting a high frequency part of the gain controlled image signal;

positioning the focus lens at a point where the evaluative value peaks; and varying a reference value depending upon the gain level used during said step of automatically controlling, wherein a displacement of the evaluative value is judged as reliable or unreliable based on the reference value.

12. The contrast auto-focus control method of claim 7, comprising the further steps of:

extracting a high frequency part of an image signal of a picture image of an object generated during photography;

wave detecting the high frequency part;

determining an evaluative value for focusing based on the wave detected high frequency part;

positioning the focus lens at a point where the evaluative value peaks; and varying a reference value depending upon the gain level sued during said step of wave detecting, wherein a displacement of the evaluative value is judged as reliable or unreliable based on the reference value.

* * * * *